Patented Apr. 2, 1929.

1,707,450

UNITED STATES PATENT OFFICE.

FRITZ SOMMER, OF BERLIN-CHARLOTTENBURG, GERMANY, ASSIGNOR TO DEUTSCHE GASGLÜHLICHT-AUER-GESELLSCHAFT MIT BESCHRÄNKTER HAFTUNG, OF BERLIN, GERMANY, A CORPORATION OF GERMANY.

PROCESS OF SEPARATING CERIUM.

No Drawing. Application filed April 21, 1925, Serial No. 24,879½, and in Germany January 18, 1924.

The customary methods for electrolytically oxidizing solutions of cerium-salts, especially solutions of cerium sulphate, offer certain drawbacks, which are experienced for instance if normally saturated acid solutions are employed. During electrolysis the basic cerium sulphate is obtained in the form of an oily substance, which will gradually solidify at low temperatures. The basic cerium sulphate thus separated will cover and choke the anode, so that electrolysis must be interrupted.

It has been found that these drawbacks can be overcome if the electrolytic oxidation is carried out in the presence of highly concentrated solutions, containing for instance an excess of cerium sulphate. In this instance the entire amount of cerium salt will remain in solution. The most practical way of working is to carry on electrolysis in a continuous manner and it has proved advantageous during electrolysis, as soon as half of the solution has been oxidized, to add some sulfuric acid.

The cerium salt may be separated out from the solutions already oxidized, by conducting the solution into water. If necessary precipitation may be promoted by neutralizing the excess of acid by means of alkalies or alkali and ammonium carbonates.

The super-saturated solutions intended for the oxidation according to the process mentioned above, are prepared by introducing dried cerium sulfate carefully into solutions which in some cases may already contain cerium sulfate.

The cerium sulfate thus obtained is free to a large extent from its customary impurities as for instance, iron, didymium, lanthanum, and so on. The removal of the last remainders of these substances from the cerium sulfate, containing 85 per cent of cerium oxide, is exceptionally difficult to attain. It is hardly possible to obtain pure compounds of cerium by precipitating or crystallizing repeatedly the basic ceric sulfate from an aqueous solution, since the impurities referred to above will tenaciously remain chemically combined with the cerium.

I have found that pure compounds of cerium can be obtained if the impure basic ceric salts are treated with electrolytes which are solutions of salts, for instance with a solution of sodium chloride. This can be effected either by precipitating the basic ceric salt in an electrolyte of this kind, whereupon the basic ceric salts thus obtained are washed with a salt solution of the character set forth and subsequently with water, or the basic ceric compound can be precipitated in a well known manner and then the precipitated matter may be freed from the impurities which accompany cerium, such as iron, didymium, and lanthanum by washing such matter with a salt solution of the character set forth, and particularly with a solution of sodium chloride, the ceric salts which are contained in the precipitate remaining unaltered by such washing, which simply removes the impurities just mentioned.

From the purified basic salts obtained as indicated above, absolutely pure cerium oxide may be prepared in any well-known or approved manner. Other pure salts of cerium may be obtained therefrom in a well known manner by treatment with acids or salts.

The impurities, as iron, didymium, and lanthanum, are found partly in the mother-lye and partly in the washings and can be recovered from these in any well-known manner. These products are almost free from cerium and can be advantageously employed in obtaining pure products.

Example.

Electrolysis is carried out while employing as an anode liquid, a super-saturated solution which is obtained by dissolving about 400 parts of dry cerous sulfate in about 1000 parts of cool water. A 5 per cent solution of sulfuric acid may be used as the cathode liquid. Preferably the electrodes will consist of lead. Usually the work is done with a diaphragm and electrolysis is carried on for about six hours with a current intensity of 1 ampere to 100 square centimetres of anode surface. As soon as the oxidation has progressed halfway, a small quantity of a 5 per cent solution of sulfuric acid is added to the analyte. After six hours approximately 99 per cent of the cerium present have been oxidized.

The ceric sulfate is separated by introducing the oxidized solution into water; if necessary precipitation may be promoted by neutralization of the acid.

In lieu of water a concentrated solution of sodium chloride may be used for precipitation, by which means an instantaneous separation of the cerium from the impurities can be obtained. However, the ceric sulfate may also be washed subsequently with a concentrated solution of sodium chloride.

Various modifications may be made without departing from the nature of my invention as set forth in the appended claims.

I claim:

1. The process of separating cerium from impurities such as didymium, iron, and lanthanum, which consists in oxidizing electrolytically at the anode, a supersaturated solution of such a cerous salt as will yield a basic ceric salt by electrolytic oxidation, and then separating a basic ceric salt.

2. The process of separating cerium from impurities such as didymium, iron, and lanthanum, which consists in oxidizing electrolytically at the anode, a highly concentrated solution of cerous sulfate, and then separating a basic ceric salt.

3. The process of separating cerium from impurities such as didymium, iron, and lanthanum, which consists in oxidizing electrolytically at the anode, a highly concentrated solution of such a cerous salt as will yield a basic ceric salt by electrolytic oxidation, adding sulfuric acid to the anolyte after the oxidation has been about half completed, and then separating a basic ceric salt.

4. The process which consists in oxidizing electrolytically at the anode, a highly concentrated solution of such a cerous salt as will yield a basic ceric salt by electrolytic oxidation, then separating a basic ceric compound, and washing said compound with a solution of sodium chloride.

In testimony whereof I have affixed my signature.

Dr. FRITZ SOMMER.